US011426798B2

(12) United States Patent
Shuck (10) Patent No.: US 11,426,798 B2
(45) Date of Patent: Aug. 30, 2022

(54) ADDITIVE MANUFACTURED ALLOY COMPONENTS

(71) Applicant: Rolls-Royce Corporation, Indianapolis, IN (US)

(72) Inventor: Quinlan Yee Shuck, Indianapolis, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 494 days.

(21) Appl. No.: 16/394,691

(22) Filed: Apr. 25, 2019

(65) Prior Publication Data

US 2019/0351485 A1 Nov. 21, 2019

Related U.S. Application Data

(60) Provisional application No. 62/671,704, filed on May 15, 2018.

(51) Int. Cl.
*B22F 10/20* (2021.01)
*B29C 64/264* (2017.01)
(Continued)

(52) U.S. Cl.
CPC ............ *B22F 10/20* (2021.01); *B22F 3/1021* (2013.01); *B29C 64/153* (2017.08);
(Continued)

(58) Field of Classification Search
CPC ... B29C 64/118; B29C 64/153; B29C 64/264; B29C 64/393; B29C 64/40; B22F 10/18;
(Continued)

(56) References Cited

U.S. PATENT DOCUMENTS 5,997,795 A * 12/1999 Danforth ................. C04B 38/00
                                                          419/36
2011/0016717 A1 * 1/2011 Morrison ................ B22F 3/105
                                                          29/889.72
(Continued)

FOREIGN PATENT DOCUMENTS

WO 2015/077536 A1 5/2015
WO 2016/125138 A2 8/2016
(Continued)

OTHER PUBLICATIONS

Extended Search Report from counterpart European Application No. 19169143.5, dated Oct. 7, 2019, 12 pp.
(Continued)

*Primary Examiner* — Nahida Sultana
(74) *Attorney, Agent, or Firm* — Shumaker & Sieffert, P.A.

(57) ABSTRACT

An additive manufacturing technique may include forming, on a surface of a substrate, a layer of material using an additive manufacturing technique. The material may include a sacrificial binder and a powder comprising an oxide-dispersion strengthened alloy dispersed in the binder. The technique may include forming, on the layer of material, at least one additional layer of material to form an additively manufactured component. The binder may be selectively sacrificed to leave the powder, for example, to form a component including an alloy.

18 Claims, 3 Drawing Sheets

(51) Int. Cl.
  *B29C 64/153* (2017.01)
  *B29C 64/393* (2017.01)
  *B29C 64/40* (2017.01)
  *B22F 3/10* (2006.01)
  *B33Y 10/00* (2015.01)
  *B33Y 30/00* (2015.01)
  *B33Y 50/02* (2015.01)
  *B33Y 70/00* (2020.01)
  *B33Y 80/00* (2015.01)
  *B22F 10/30* (2021.01)

(52) U.S. Cl.
  CPC .......... *B29C 64/264* (2017.08); *B29C 64/393* (2017.08); *B29C 64/40* (2017.08); *B22F 10/30* (2021.01); *B33Y 10/00* (2014.12); *B33Y 30/00* (2014.12); *B33Y 50/02* (2014.12); *B33Y 70/00* (2014.12); *B33Y 80/00* (2014.12)

(58) Field of Classification Search
  CPC .......... B22F 10/20; B22F 10/30; B22F 3/115; B22F 3/1017; B22F 3/1021; C22C 1/05; C22C 1/051; B33Y 30/00; B33Y 50/02; B33Y 70/00
  See application file for complete search history.

(56) References Cited

U.S. PATENT DOCUMENTS

| | | |
|---|---|---|
| 2014/0154088 A1 | 6/2014 | Etter et al. |
| 2014/0294652 A1 | 10/2014 | Morrison et al. |
| 2014/0367894 A1 | 12/2014 | Kramer et al. |
| 2017/0209923 A1 | 7/2017 | Giovannetti et al. |
| 2017/0297099 A1 | 10/2017 | Gibson et al. |
| 2018/0236731 A1* | 8/2018 | Natarajan .............. B33Y 40/00 |
| 2019/0210294 A1* | 7/2019 | Hudelson ................ B22F 10/20 |

FOREIGN PATENT DOCUMENTS

| | | |
|---|---|---|
| WO | 2016/125138 A3 | 8/2016 |
| WO | 2017/081160 A1 | 5/2017 |

OTHER PUBLICATIONS

Response to the Extended European Search Report from counterpart EP Application No. 19169143.5 dated Oct. 7, 2019, filed May 19, 2020, 56 pgs.

Communication pursuant to Article 94(3) EPC from counterpart European Application No. 19169143.5 dated Dec. 22, 2021, 5 pp.

Response to Communication pursuant to Article 94(3) EPC dated Dec. 22, 2021, from counterpart European Application No. 19169143.5 filed Apr. 20, 2022, 47 pp.

* cited by examiner

ADDITIVE MANUFACTURED ALLOY COMPONENTS

This application claims the benefit of U.S. Provisional Application No. 62/671,704, filed May 15, 2018, which is incorporated herein by reference in its entirety.

TECHNICAL FIELD

The disclosure relates to additive manufacturing techniques, in particular, to additive manufacturing of alloy components.

BACKGROUND

Additive manufacturing generates three-dimensional structures through addition of material layer-by-layer or volume-by-volume to form the structure, rather than removing material from an existing volume to generate the three-dimensional structure. Additive manufacturing may be advantageous in many situations, such as rapid prototyping, forming components with complex three-dimensional structures, or the like. In some examples, additive manufacturing may include fused deposition modeling, in which heated material, such as polymer, is extruded from a nozzle and cools to be added to the structure, or stereolithography, in which an energy source is used to selectively cure a liquid photopolymer resin to a desired shape of the component.

SUMMARY

The disclosure describes example techniques, systems, materials, and compositions for additively manufacturing alloy components.

In some examples, the disclosure describes a technique that includes forming, on a surface of a substrate, a layer of material using an additive manufacturing technique. The material may include a sacrificial binder and a powder comprising an oxide-dispersion strengthened alloy dispersed in the binder. The technique may include forming, on the layer of material, at least one additional layer of material to form an additively manufactured component. The binder may be selectively sacrificed to leave the powder, for example, to form a component including an alloy.

In some examples, the disclosure describes an additive manufacturing system. The system includes a substrate defining a major surface. The system includes means for additively forming layers of a material using an additive manufacturing technique. The system includes a computing device configured to control the means for additively forming layers to form a layer of material on the major surface of the substrate. The material includes a sacrificial binder and a powder comprising an oxide-dispersion strengthened alloy dispersed in the binder. The computing device is configured to control the means for additively forming layers to form, on the layer of material, at least one additional layer of material to form an additively manufactured component.

In some examples, the disclosure describes a non-transitory computer-readable storage device comprising instructions that, when executed, cause one or more processors of a computing device to control means for additively forming layers to form a layer of material on a major surface of a substrate. The material includes a sacrificial binder and a powder comprising an oxide-dispersion strengthened alloy dispersed in the binder. The instructions, when executed, cause the one or more processors to control the means for additively forming layers to form, on the layer of material, at least one additional layer of material to form an additively manufactured component.

In some examples, the disclosure describes a material formed by additive manufacturing. The material includes a powder including an oxide-dispersion strengthened (ODS) alloy. The material includes a sacrificial binder. The powder is dispersed in the binder. The material includes more than about 80% by volume of the powder to form a rigid component in response to selective sacrifice of the binder from the material.

The details of one or more examples are set forth in the accompanying drawings and the description below. Other features, objects, and advantages will be apparent from the description and drawings, and from the claims.

DETAILED DESCRIPTION

The disclosure generally describes techniques for forming additively manufactured components including alloys. Additive manufacturing of metal or alloy components may present unique challenges, for example, compared to additive manufacturing of polymeric components. For example, while techniques such as powder bed fusion (including direct metal laser sintering, electron beam melting, selective laser sintering, or the like) which use a directed energy beam to fuse and sinter material may be useful in additive manufacturing, some alloys (for example, oxide-dispersion strengthened alloys) may respond to energy beams in a manner that may not be conducive to localized fusion or localized sintering. Further, powder bed fusion may leave residual unfused or unsintered powder residue, for example, within channels or hollow internal passages of an additively manufactured component. Powder bed fusion of high temperature alloys may also result in components that may be prone to cracking due to localized melting and thermal gradients.

In some examples, a material including a sacrificial binder and a powder including at least one oxide-dispersion strengthened (ODS) alloy dispersed in the binder may be deposited to form an additively manufactured component. After additively forming one or more layers of the component, or after forming the entire component, the binder may be selectively removed or sacrificed from the layers or the component, for example, by thermally oxidizing, decomposing, charring the binder, by any other suitable sacrificial energy, or by chemical dissolution, for example, using a solvent or medium that can dissolve or otherwise selectively remove the binder. Sacrificing the binder from the layers or the component may leave substantially only the powder in the layers or the component. Thus, a component including substantially only the ODS alloy may be eventually formed. The component may be further treated, for example, by sintering, to strengthen or densify the powder.

Example additively manufactured components according to the disclosure may be further treated, for example, by one or both of sacrificing (e.g., removing) the binder to leave substantially only the alloy in the component, or sintering the component. In some techniques, for example, fused deposition techniques, the binder may be sacrificed intermittently during forming of the component, for example, between successive layers, volumes, or portions of deposited material, or may be sacrificed after the component is completely formed.

Thus, example techniques, systems, materials, and compositions according to the disclosure may be used for additively manufacturing alloy components, for example, high temperature alloys such as oxide-dispersion strengthened (ODS) alloys or other alloys that may pose difficulties in additive manufacturing through fusion bed processes or other additive manufacturing techniques.

Figure 1:
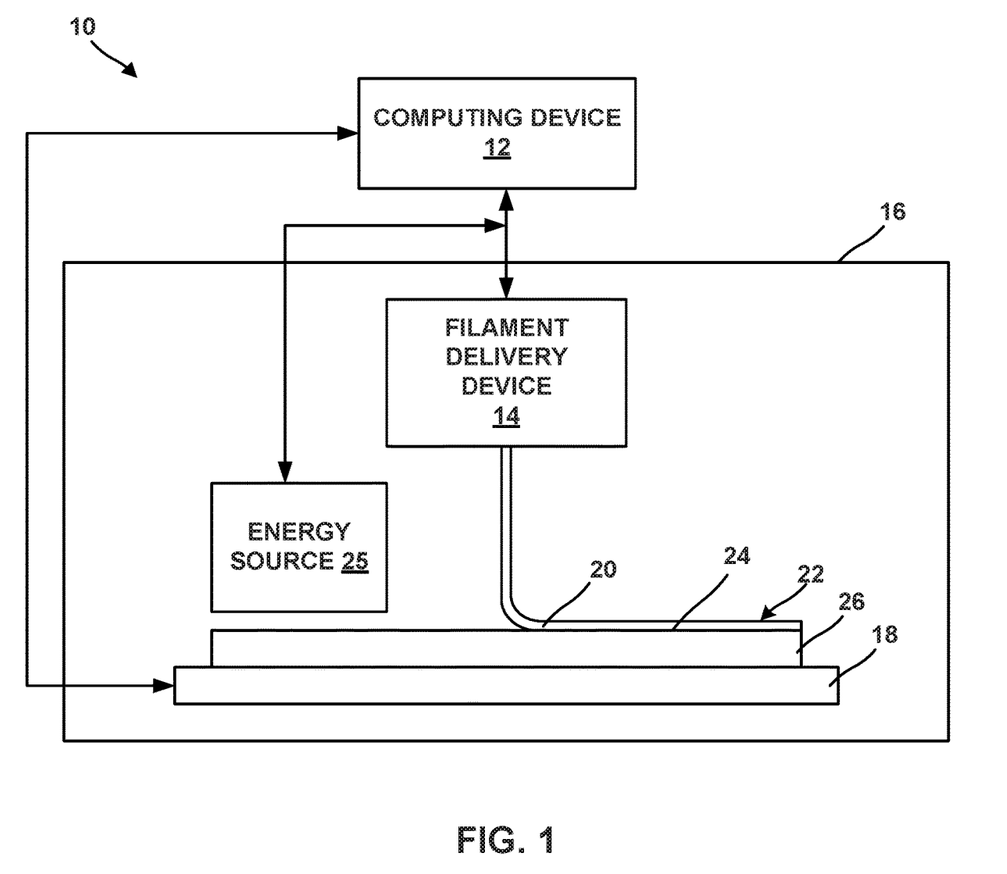
FIG. 1 is a conceptual block diagram illustrating an example system for forming an additively manufactured component including a powder and a binder by filament delivery.

FIG. 1 is a conceptual block diagram illustrating an example additive manufacturing system 10 for performing an additive manufacturing technique to form an additively manufactured component including a powder and a binder by filament delivery. Additive manufacturing system 10 is a fused deposition modeling or fused filament fabrication system.

Additive manufacturing system 10 may include computing device 12, filament delivery device 14, enclosure 16, and stage 18.

Computing device 12 may include, for example, a desktop computer, a laptop computer, a workstation, a server, a mainframe, a cloud computing system, or the like. Computing device 12 is configured to control operation of additive manufacturing system 10, including, for example, filament delivery device 14, stage 18, or both. Computing device 12 may be communicatively coupled to filament delivery device 14, stage 18, or both using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like. In come examples, computing device 12 may include control circuitry, such as one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Filament delivery device 14 may include a filament reel that holds wound filament including a composition. Filament delivery device 14 may advance the filament from the reel and heat the filament to above a softening or melting point of the composition. The softened or melted filament 20 is then extruded from a nozzle or a die and laid down in a road 22 on a major surface 24 of a substrate 26 (or, in subsequent layers, on a previously deposited road). The softened or melted filament 20 cools and, in this way, is joined to other roads. Substrate 26 may include a build plate on stage 18, or any suitable substrate defining a build surface. In some examples, system 10 may not include a separate substrate 26, and softened or melted filament 20 may be deposited on a build surface defined by stage 18, or on another component, or on layers of prior softened or melted filament 20 or another material.

In some examples, filament delivery device 14 may include, instead of the filament reel, a chamber that holds a volume of a composition. The composition may be flowable, extrudable, or drawable from filament delivery device 14, for example, from a nozzle or a die of filament delivery device 14, in the form of softened or melted filament 20 that may be deposited on or adjacent stage 18 or substrate 26. Softened or melted filament 20 of the composition may be dried, cured, or otherwise solidified to ultimately form an additively manufactured component. In some examples, system 10 may include an energy delivery device (not shown in FIG. 1) configured to deliver energy to softened or melted filament 20 to cure softened or melted filament 20, for example, by photocuring or thermally curing the composition of softened or melted filament 20.

In some examples, softened or melted filament 20, or the composition that forms softened or melted filament 20, includes a powder including an oxide-dispersion strengthened (ODS) alloy. The ODS alloy may include at least one of a superalloy or a particle-dispersion strengthened alloy. ODS alloys are alloys strengthened through the inclusion of a fine dispersion of oxide particles. For example, an ODS alloy may include a high temperature metal matrix including oxide nanoparticles, for example, yttria ($Y_2O_3$). ODS alloys may include nickel chromium ODS alloys, thoria-dispersion strengthened nickel and nickel chromium alloys, nickel aluminide and iron aluminide ODS alloys, iron chromium aluminide ODS alloys. Other strengthening particles may include alumina, hafnia, zirconia, beryllia, magnesia, titanium oxide, and carbides including silicon carbide, hafnium carbide, zirconium carbide, tungsten carbide, and titanium carbide.

Powders including ODS alloys may be formed by, for example, mixing a plurality of particles of metal(s) and oxide(s) forming the ODS alloy to form a mixture, melting at least part of the mixture to form a melted mixture including oxide particles, and atomizing the melted mixture into the powdered form. Alternatively, the powdered form of the ODS alloy may be provided by hydrometallurgical processes, or any suitable technique for preparing an ODS alloy.

In some examples, ODS alloys may be characterized by the dispersion of fine oxide particles and by an elongated grain shape, which may enhance high temperature deformation behavior by inhibiting intergranular damage accumulation.

The composition in the filament or the chamber within filament delivery device 14 may optionally include a curable polymer precursor. The curable polymer precursor may be curable (for example, thermally curable or photocurable) to form a binder. For example, the composition may be cured as melted or softened filaments 20 are extruded and/or after melted or softened filaments 20 are laid down in roads 22 to form a material including the powder dispersed in the binder, for example substantially uniformly dispersed in the binder. The binder may include a polymeric material, such as a thermoplastic. Example thermoplastics include polyvinyl alcohol, polyolefins, polystyrene, acrylonitrile butadiene styrene, polylactic acid, thermoplastic polyurethanes, aliphatic polyamides, or the like, or combinations thereof. The curable polymer precursor may include a precursor, for example, one or more monomers, oligomers, or non-cross-linked polymers suitable for forming the polymeric material of the binder upon curing. Thus, in some examples, an energy source may direct energy at a curable polymer precursor, for example, in the composition, to selectively cure the curable polymer precursor to form the roads 22 including the material that includes the alloy particles and binder. In other example, the heat to which the composition is exposed to form melted or softened filaments 20 may initiate the curing reaction, and no additional energy source is used. In some examples, the binder includes the polymer formed by curing of the curable polymer precursor.

In some examples, the composition may include, instead of, or in addition to, the curable polymer precursor, a flowable carrier. The flowable carrier may impart flowability to the composition, such that the composition may be extruded or drawn from filament delivery device 14 as filaments 20. The flowable carrier may be removed from filaments 20, for example, by drying, evaporation, or the like, to cause filaments 20 to solidify. The flowable carrier may include an organic or inorganic solvent or mixture of solvents. In some examples, instead of, or in addition to, one or more solvents, the flowable carrier may include one or more of a gel, a resin, a monomer, an oligomer, a polymer, or a lubricant. In some examples, one or more of the resin, monomer, oligomer, or polymer may be substantially the same as the curable polymer precursor. In other examples, one or more of the resin, monomer, oligomer, or polymer may be different from the curable polymer precursor.

Regardless of how road 22 is deposited, road 22 includes the sacrificial binder and the powder including the oxide-dispersion strengthened alloy. The binder may be selectively sacrificed from road 22, to substantially leave only the powder in road 22. In some examples, the binder may be periodically sacrificed from one or more roads 22 after depositing a predetermined number of roads 22. In other examples, the binder may be sacrificed after a complete component including a plurality of roads 22 is fabricated, to substantially leave only the powder in the component.

In some examples, system 10 may optionally include an energy source 25. Energy source 25 may deliver energy for selectively sacrificing the binder. In some examples, energy source 25 may include a thermal energy source, microwave energy source, electrical energy source, ultrasound energy source, photoenergy source, chemical source or any source suitable or configured to cause the binder to be selectively sacrificed while substantially leaving the powder intact. In some examples, system 10 may include a chamber for containing and dispensing a composition capable of selectively chemically sacrificing the binder, for example, a solvent, reactant, or an suitable medium for chemically removing the binder, for example, from one or more layers of an additively manufactured component, or from a completely built component.

In some examples, the composition includes a selected amount of curable polymer precursor and powder including ODS alloy so that the material in roads 22 includes more than about 80% by volume of the powder including the ODS alloy, which may result in a rigid component being formed in response to selective thermal sacrifice of the binder. In some examples, the material in roads 22 includes binder in a concentration configured to cause the material to shrink by less than about 20% of an initial volume of the material in response to selectively sacrificing the binder. For example, the material in roads 22 may include less than about 20% by volume of the binder.

In some examples, the composition and the material in roads 22 includes at least one shrink-resistant agent. For example, the at least one shrink-resistant agent may include a ceramic.

In some examples, additive manufacturing system 10 includes enclosure 16, which at least partially encloses filament delivery device 14, stage 18, and substrate 26. Enclosure 16 may provide physical protection to filament delivery device 14, stage 18, and substrate 26 during operation of additive manufacturing system 10, may maintain an atmosphere within enclosure 16 in a desired state (e.g., filled with an inert gas, under vacuum, or maintained at a desired temperature), or the like. In some examples, enclosure 16 may define a furnace or another thermal chamber or environment in which any predetermined temperature sufficient to thermally sacrifice the binder may be maintained. In some examples, enclosure 16 may include thermally insulative walls, and energy source 25 within enclosure 16 may provide a source of heat to cause an interior of enclosure 16 to be heated. In some examples, one or more heating elements or coils may be disposed in or on walls of enclosure 16 to cause an interior of enclosure 16 to be heated.

In some examples, stage 18 is movable relative to filament delivery device 14 and/or filament delivery device 14 is movable relative to stage 18. For example, stage 18 may be translatable and/or rotatable along at least one axis to position substrate 26 relative to filament delivery device 14. Similarly, filament delivery device 14 may be translatable and/or rotatable along at least one axis to position filament delivery device 14 relative to substrate 26. Stage 18 may be configured to selectively position and restrain substrate 26 in place relative to stage 18 during manufacturing of the additively manufactured component.

Computing device 12 may control movement and positioning of filament delivery device 14 relative to stage 18, and vice versa, to control the locations at which roads 22 are formed. Computing device 12 may control movement of filament delivery device 14, stage 18, or both, based on a computer aided manufacturing or computer aided design (CAM/CAD) file. For example, computing device 12 may control filament delivery device 14 to trace a pattern or shape to form a layer including a plurality of roads on surface 24. Computing device 12 may control filament delivery device 14 or stage 18 to move substrate 26 away from filament delivery device 14, then control filament delivery device 14 to trace a second pattern or shape to form a second layer including a plurality of roads on the first layer. Computing device 12 may control stage 18 and filament delivery device 14 in this manner to result in a plurality of layers, each layer including a traced shape or design. Together, the plurality of layers defines an additively manufactured component.

In some examples, the additively manufactured component may define one or more channels or voids, for example, having any suitable cross-sectional shape, including rectangular, triangular, trapezoidal, curvilinear, or the like, or may include channels, pillars, plateaus, or other features. While techniques such as powder bed fusion may leave a powder residue that may occupy voids, channels, or spaces or regions between features of the additively manufactured component, example systems and techniques according to the disclosure may be used to form additively manufactured component from which residual powder is substantially absent, for example, completely absent.

For example, the powder may only be substantially present within filaments 20 and roads 22, and free powder may not be deposited or otherwise delivered by system 10. System 10 may deposit series of roads 22 with predetermined spacing or interruptions between different roads 22, or between different layers including roads 22 to define voids or channels between roads 22 or between layers. For example, a void or channel may be defined by a region in which roads 22 are absent, and may be surrounded by roads 22 or one or more layers including roads 22. Thus, free powder or other residual material may be absent or substantially absent from voids or channels in the additively manufactured component.

After one or more layers of the additively manufactured component have been formed (e.g., from a plurality of adjacent roads 22), or after the complete component is formed by additive manufacturing, the component may be subjected to further treatment, for example, to one or both of selectively remove the binder to leave only the powder including ODS alloys, or to sinter the component. In some examples, system 10 may include a heating element or an energy delivering device, for example, energy source 25, for delivering energy suitable to selectively sacrifice the binder while leaving the powder, or to sinter the powder. For example, after sacrificing the binder, energy source 25 or other heating elements or coils in, on, or adjacent to walls of enclosure 16 may be used to provide thermal energy to maintain a temperature sufficient for sintering the powder.

Figure 2:
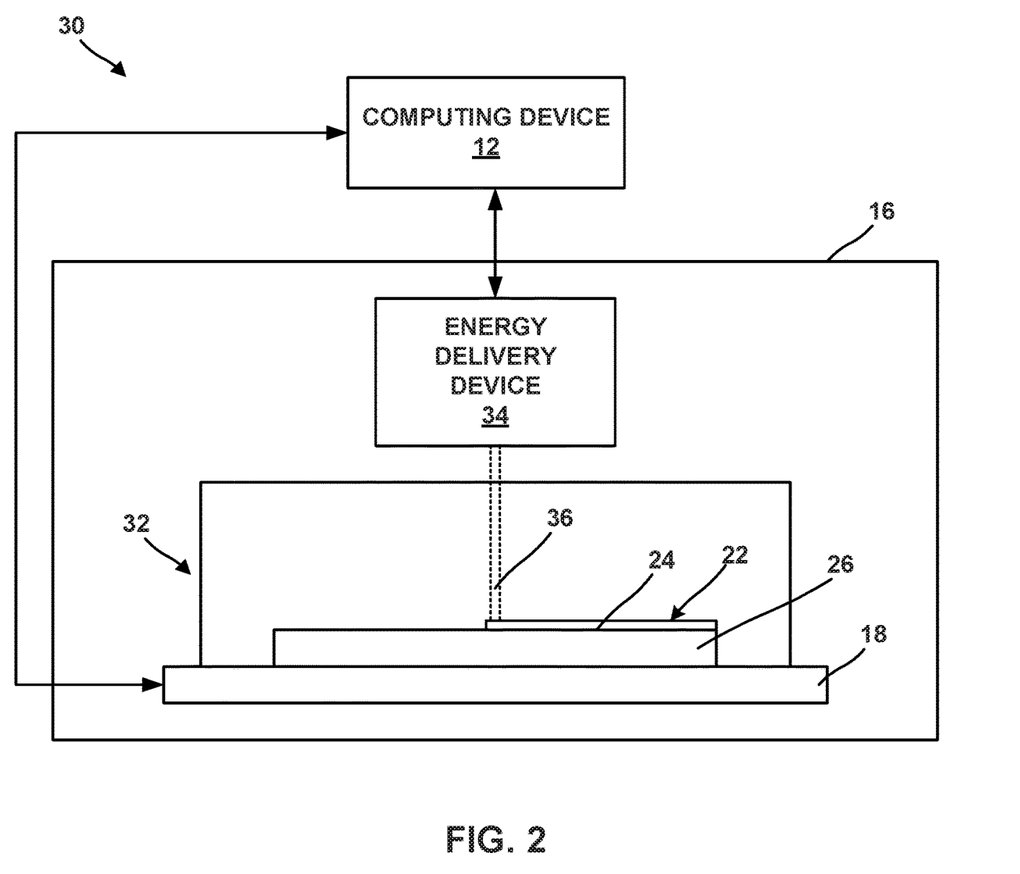
FIG. 2 is a conceptual diagram illustrating an example system for forming an additively manufactured component including a powder and a binder by selectively directing energy.

FIG. 1 illustrates a first example means for additively forming layers of material using an additive manufacturing technique. FIG. 2 illustrates a second example means for additively forming layers of material using an additive manufacturing technique.

FIG. 2 is a conceptual block diagram illustrating an example additive manufacturing system 30 for forming an additively manufactured component including a powder and a binder by selectively directing energy. Like additive manufacturing system 10 of FIG. 1, additive manufacturing system 10 may include computing device 12, enclosure 16, and stage 18. Each of these components may be similar to or substantially the same as the respective components in FIG. 1. Instead of filament delivery device 14, additive manufacturing system 30 includes energy delivery device 34.

Thus, in the example illustrated in FIG. 2, system 30 includes computing device 12, an energy delivery device 34, enclosure 16, stage 18, a vat 32, and substrate 26. Computing device 12 is operably connected to energy delivery device 34 and stage 18. In the example of FIG. 2, additive manufacturing system 10 is a stereolithographic printing system.

In some examples, additive manufacturing system 10 includes enclosure 16, which at least partially encloses energy delivery device 34, stage 18, vat 32, and substrate 26. Enclosure 16 may provide physical protection to energy delivery device 34, stage 18, vat 32, and substrate 26 during operation of additive manufacturing system 10, may maintain an atmosphere within enclosure 16 in a desired state (e.g., filled with a gas that is substantially inert to a liquid photopolymer resin in vat 32 or maintained at a desired temperature), or the like.

In some examples, stage 18 is movable relative to energy delivery device 34 and/or energy delivery device 34 is movable relative to stage 18. For example, stage 18 may be translatable and/or rotatable along at least one axis to position substrate 26 relative to energy delivery device 34. Similarly, energy delivery device 34 may be translatable and/or rotatable along at least one axis to position energy delivery device 34 relative to substrate 26. Stage 18 may be configured to selectively position and restrain substrate 26 in place relative to stage 18 during manufacturing of the additively manufactured component.

Vat 32 may be positioned on stage 18 and may contain a liquid photopolymer resin. The photopolymer may include oligomers, such as epoxides, urethanes, polyethers, polyesters, or mixtures thereof. In some examples, the oligomers may be functionalized by a reactive group, such as an acrylate. The liquid photopolymer resin also may include monomers that may affect cure rates, crosslink density of the cured resin, viscosity of the liquid photopolymer resin, or the like. Example monomers may include styrene, N-vinylpyrrolidone, acrylates, or the like. The liquid photopolymer resin further may include a photoinitiator.

Vat 32 also contains powder including one or more ODS alloy. The powder may be uniformly dispersed or suspended in the resin. Thus, curing the photopolymer resin forms material including the powder dispersed in the cured material. The cured material then may be a sacrificial binder, as described with respect to FIG. 1.

In some examples, as shown in FIG. 2, additive manufacturing system 30 may cure the liquid photopolymer resin in a top-down orientation. In other examples, additive manufacturing system 10 may cure the liquid photopolymer resin in a bottom-up orientation, in which case the orientation of stage 18, vat 32, and energy delivery device 34 may be vertically flipped (i.e., energy delivery device 34 may be below and focused up toward stage 18).

Energy delivery device 34 may include an energy source, such as a laser source, an electron beam source, plasma source, or another source of energy that may be absorbed by the liquid photopolymer resin. Example laser sources include a CO laser, a $CO_2$ laser, a Nd:YAG laser, or the like. In some examples, the energy source may be selected to provide energy with a predetermined wavelength or wavelength spectrum that may be absorbed by the liquid photopolymer resin, e.g., a wavelength or wavelength range in the ultraviolet wavelength spectrum.

In some examples, energy delivery device 34 also includes an energy delivery head, which is operatively connected to the energy source. The energy delivery head may focus or direct the energy toward predetermined positions adjacent substrate 26 or within vat 32 during the additive manufacturing technique. As described above, in some examples, the energy delivery head may be movable in at least one dimension (e.g., translatable and/or rotatable) under control of computing device 12 to direct the energy toward a selected location adjacent substrate 26 or within vat 32.

Similar to filament delivery device 14, computing device 12 may be configured to control operation of energy delivery device 34, stage 18, or both to position substrate 26 relative to energy delivery device 34 (and more particularly, a focal volume of energy delivery device 34). For example, as described above, computing device 12 may control stage 18 and energy delivery device 34 to translate and/or rotate along at least one axis to position substrate 26 relative to energy delivery device 34. Positioning substrate 26 relative to energy delivery device 34 may include positioning surface 24 (e.g., a surface to which material is to be added) of substrate 26 in a predetermined orientation relative to energy delivery device 34.

For example, during manufacturing of an additively manufactured component with additive manufacturing system 10, computing device 12 may control movement of energy delivery device 34, stage 18, or both, based on a computer aided manufacturing or computer aided design (CAM/CAD) file. Computing device 12 may control movement of energy delivery device 34 to cause an energy beam 36 emitted by energy delivery device 34 to trace a desired shape or design in a layer of the liquid photopolymer resin, e.g., a layer of the liquid photopolymer resin adjacent to structured surface 24 of substrate 26, curing the liquid photopolymer resin at locations substantially corresponding to the traced shape or design, e.g., in a layer 26. Computing device 12 then may control stage 18 to move, e.g., away from energy delivery device 34, which may result in uncured liquid photopolymer resin covering the traced shape or design. Computing device 12 may again control movement of energy delivery device 34 to cause energy beam 36 to trace a second desired shape or design in the uncured liquid photopolymer resin on the cured photopolymer, curing the liquid photopolymer resin at locations substantially corresponding to the second traced shape or design. Computing device 12 may control stage 18 and energy delivery device 34 in this manner to result in a plurality of cured photopolymer layers, each layer including a traced shape or design. Together, the plurality of cured photopolymer layers defines an additively manufactured component.

In some examples, curing of the photopolymer resin by energy beam 36 may form the binder in which the powder is dispersed. For example, one or more monomeric, oligomeric, or polymeric components of the photopolymer resin may be partially or fully cured (for example, by crosslinking) to form the binder. In other examples, the photopolymer resin may include one or more monomeric, oligomeric, or polymeric components that are not cured by energy beam 36 and persist after the curing to remain as the binder. Thus, system 30 of FIG. 2 may alternatively be used to form an additively manufactured component including a material including the binder and the powder including one or more ODS alloys dispersed in the binder.

After one or more layers of the additively manufactured component or formed, or after the complete component is formed by additive manufacturing, the component may be subjected to further treatment, for example, to one or both of selective removing the binder to leave only the powder including ODS alloys, or to sinter the component. In some examples, system 10 or system 30 may include a heating element or energy source 25 (or energy delivery device 34) for delivering energy suitable to selectively sacrifice the binder while leaving the powder, or to sinter the powder. In some examples, instead of, or in addition to energy delivery device 34, system 30 may include energy source 25 described with reference to FIG. 1. In some examples, instead of, or in addition to, energy source 25, system 10 may include energy delivery device 34. Thus, one or both of energy source 25 or energy delivery device 34 may optionally be used to sacrifice the binder, or to sinter the powder, in system 10 or system 30.

Figure 3:
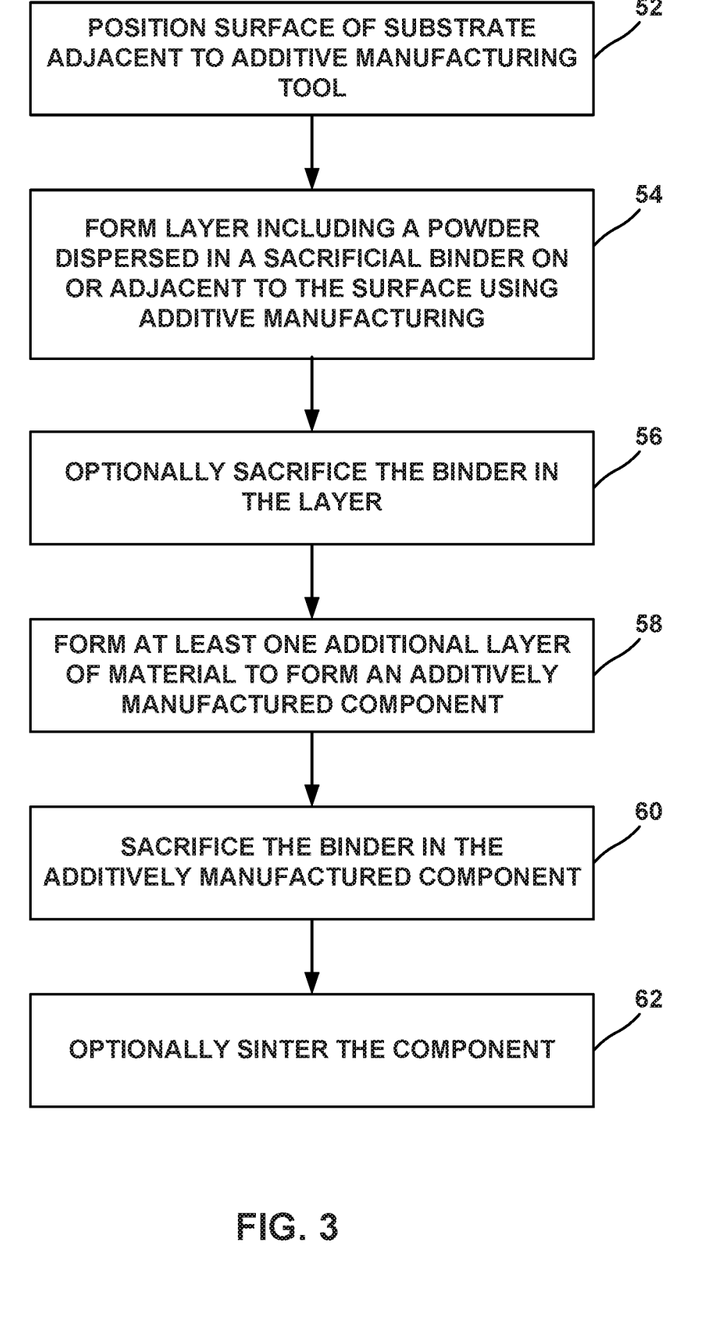
FIG. 3 is a flow diagram illustrating an example technique for forming an additively manufactured alloy component.

An example technique that may be implemented by system 10 or 30 will be described with concurrent reference to FIG. 3. FIG. 3 is a flow diagram illustrating an example technique for forming an additively manufactured component including at least one feature smaller than a base resolution of the additive manufacturing technique. Although the technique of FIG. 3 is described with respect to system 10 of FIG. 1, in other examples, the technique of FIG. 3 may be performed by other systems, such as system 30 of FIG. 2 or other systems including fewer or more components than those illustrated in FIG. 1. Similarly, systems 10 and 30 may be used to performed other additive manufacturing techniques.

The technique of FIG. 3 includes positioning substrate 26 including surface 24 adjacent to a build position, e.g., on stage 18 (52). In some examples, system 10 may not include a separate substrate 26, the technique of FIG. 3 may include positioning a build surface defined by stage 18, or by another component, or layers of prior softened or melted filament 20 or another material.

The technique of FIG. 3 also includes forming a road 22 of material using an additive manufacturing technique (54). The material includes a powder including one or more ODS alloys dispersed in a sacrificial binder. Computing device 12 may cause filament delivery device 14 to deposit softened or melted filament 20 in one or more roads 22 to ultimately form the additively manufactured component. A plurality of roads 22 defining a common plane may define a layer of material. Thus, successive roads 22 may define a series of layers, for example, parallel layers, and the series of layers may eventually define the additively manufactured component. In some examples, computing device 12 may cause energy deliver device 34 to cure the photopolymer resin in vat 32 to form the additively manufactured component. Thus, the additive manufacturing technique (54) may include fused deposition modeling, for example, as described with reference to system 10 of FIG. 1. In some examples, the additive manufacturing technique (54) may include stereolithography, for example, as described with reference to system 30 of FIG. 2. In some examples, the forming (54) may include directing an energy source (for example, energy delivery device 34) at a curable polymer precursor to selectively cure the curable polymer precursor to form the layer of softened or melted filament 20. In some examples, the binder includes the polymer formed by curing of the curable polymer precursor.

The technique of FIG. 3 optionally includes sacrificing the binder in the roads 22 (56). For example, the technique may include alternating deposition or formation of roads 22 and sacrificing the binder in or more one roads 22 in a partially formed additively manufactured component. The sacrificing (56) may include delivering thermal or any suitable energy, for example, by one or both of energy source 25 or energy delivery device 34, to roads 22 sufficient to cause binder to be substantially oxidized, incinerated, carbonized, charred, decomposed, or removed from roads 22, while leaving the powder including the ODS alloy substantially intact. In some examples, the technique of FIG. 3 may include alternating the selectively sacrificing the binder (56) with the forming (60) of layer of softened or melted filament 20.

The technique of FIG. 3 also includes forming, on roads 22 of material, at least one additional layer of material to form an additively manufactured component (58). For example, computing device 12 may control movement of filament delivery device 14 (or energy delivery device 34), stage 18, or both, based on a computer aided manufacturing or computer aided design (CAM/CAD) file.

In some examples, computing device 12 may control movement and positioning of filament delivery device 14 relative to stage 18, and vice versa, to control the locations at which roads 22 are formed. Computing device 12 may control movement of energy delivery device 14, stage 18, or both, based on a computer aided manufacturing or computer aided design (CAM/CAD) file. For example, computing device 12 may control filament delivery device 14 to trace a pattern or shape to form a layer including a plurality of roads 22 on surface 24. Computing device 12 may control filament delivery device 14 or stage 18 to move substrate 26 away from filament delivery device 14, then control filament delivery device 14 to trace a second pattern or shape to form a second layer including a plurality of roads on the previously deposited layer. Computing device 12 may control stage 18 and filament delivery device 14 in this manner to result in the plurality of layers, each layer including a traced shape or design. Together, the plurality of layers defines an additively manufactured component (58).

Instead of using filament delivery device 14, computing device 12 may control movement of energy delivery device 34 to cause filament beam 36 to trace a desired shape or design in a layer of the liquid photopolymer resin to form each additional layer of material, curing the liquid photopolymer resin at locations substantially corresponding to the traced shape or design. Computing device 12 then may control stage 18 to move, e.g., away from energy delivery device 34, which may result in uncured liquid photopolymer resin covering the traced shape or design. Computing device 12 may again control movement of energy delivery device 34 to cause energy beam 36 to trace a desired shape or design in the uncured liquid photopolymer resin on the cured photopolymer, curing the liquid photopolymer resin at locations substantially corresponding to the traced shape or design. Computing device 12 may control stage 18 and energy delivery device 34 in this manner to result in a plurality of cured photopolymer layers, each layer including a traced shape or design. Together, the plurality of cured photopolymer layers defines an additively manufactured component (58).

The technique of FIG. 3 includes, after forming the additively manufacturing component (58), sacrificing the binder from the component (60). Similar to the optional sacrificing (56), the sacrificing (60) may include delivering thermal or any suitable energy, for example, by one or both of energy source 25 or energy delivery device 34, to roads 22 sufficient to cause binder to be substantially oxidized, incinerated, carbonized, charred, decomposed, or removed from roads 22, while leaving the powder substantially intact. In some examples, even if the optional sacrificing (56) is performed, the sacrificing (60) may be performed to ensure sacrifice or removal of substantially all of the binder to leave substantially only the powder including one or more ODS alloys. In other examples, if the optional sacrificing (56) is performed to cause the binder to be substantially removed from each road 22, the sacrificing (60) may not be performed.

The technique of FIG. 3 optionally includes, after sacrificing the binder (60) (or after otherwise forming the component from which binder is sacrificed to leave only the powder), sintering the component (62). The sintering may include a thermal treatment, for example, one or more predetermined cycles of exposure to predetermined temperatures for predetermined times. In some examples, one or both of energy source 25 or energy delivery device 34 may deliver energy to cause sintering. In some examples, the sintering (62) may promote the bonding of particles of powder to each other to strengthen the component including substantially only the powder after the binder is sacrificed. The sintering (62) may also densify an interior or a surface region of the component, for example, by promoting powder compaction and reducing porosity.

Thus, the technique of FIG. 3 may be used to additively form a component including a binder and a powder including an ODS alloy, and then sacrifice or remove the binder to ultimately form an ODS alloy component.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
depositing, from a filament delivery device, a softened or melted filament onto a surface of a substrate to form a first layer of material on the surface of the substrate, wherein the filament comprises a sacrificial binder and a powder comprising an oxide-dispersion strengthened alloy dispersed in the binder;
depositing, from the filament delivery device, the softened or melted filament on the first layer of material to form at least one additional layer of material on the first layer of material, wherein the first layer of material and the at least one additional layer of material, in combination, form an additively manufactured component;
selectively sacrificing the sacrificial binder of the deposited filament to leave the powder in the material; and
sintering the powder of the additively manufactured component to form a sintered additively manufactured component.

2. The method of claim 1, wherein the sacrificial binder comprises a curable polymer precursor, the method further comprising directing an energy source at the deposited softened or melted filament to selectively cure the curable polymer precursor to form the layer of material.

3. The method of claim 1, wherein the sacrificial binder in the first layer of material comprises a polymer formed by curing of the curable polymer precursor.

4. The method of claim 1, wherein selectively sacrificing the binder comprises alternating selectively sacrificing the binder with the deposition of the softened or melted filament by the filament delivery device to form respective layers of the additively manufactured component.

5. The method of claim 1, wherein selectively sacrificing the binder comprises selectively thermally or chemically sacrificing the binder after forming the additively manufactured component to remove the sacrificial binder from the additively manufactured component.

6. The method of claim 1, wherein the filament comprises more than about 80% by volume of the powder dispersed in the sacrificial binder and less than 20% by volume of the sacrificial binder.

7. The method of claim 1, wherein the filament comprises more than about 80% by volume of the oxide-dispersion strengthened alloy.

8. The method of claim 1, wherein the sacrificial binder comprises a curable polymer precursor, the method further comprising heating the filament with the filament delivery device to soften or melt the filament for deposition onto the surface of the substrate, and wherein the heating of the filament with the filament delivery device initiates curing of the curable polymer precursor.

9. The method of claim 1, wherein the oxide-dispersion strengthened alloy comprises at least one of a superalloy or a particle-dispersion strengthened alloy.

10. The method of claim 1, wherein the filament includes at least one shrink-resistant agent.

11. The method of claim 1, wherein the filament comprises the sacrificial binder in a concentration configured to cause the material to shrink by less than about 20% of an initial volume of the deposited filament in response to selectively sacrificing the binder.

12. The method of claim 2, wherein the energy source includes a laser.

13. The method of claim 1, wherein depositing, from the filament delivery device, the softened or melted filament onto the surface of the substrate to form the first layer of material on the surface of the substrate comprises depositing the softened or melted filament onto the surface of the substrate to form a plurality of roads adjacent to each other, the plurality of roads combining to form the first layer of the material on the surface of the substrate.

14. The method of claim 1, wherein selectively sacrificing the sacrificial binder of the deposited filament to leave the powder in the material comprises sacrificing the sacrificial binder of the deposited filament in the first layer of material prior to depositing the softened or melted filament on the first layer of material to form at least one additional layer of material on the first layer of material, and subsequently sacrificing the sacrificial binder of the deposited filament in the at least one additional layers.

15. The method of claim 1, wherein the sacrificial binder comprises a thermoplastic.

16. The method of claim 15, wherein the thermoplastic includes at least one of a polyvinyl alcohol, a polyolefin, a polystyrene, an acrylonitrile butadiene styrene, a polylactic acid, a thermoplastic polyurethane, or an aliphatic polyamides.

17. The method of claim 1, wherein depositing, from the filament delivery device, the softened or melted filament onto the surface of the substrate to form the first layer of material on the surface of the substrate comprises extruding, from a nozzle of the filament delivery device, the softened or melted filament onto the surface of the substrate to form the first layer of material on the surface of the substrate.

18. The method of claim 1, wherein selectively sacrificing the sacrificial binder of the deposited filament to leave the powder in the material comprises chemically dissolving the sacrificial binder to leave the powder.

* * * * *